United States Patent
Kawashiro et al.

(10) Patent No.: US 10,550,450 B2
(45) Date of Patent: Feb. 4, 2020

(54) METHOD OF LEACHING COPPER FROM COPPER SULFIDE ORE AND METHOD OF EVALUATING IODINE LOSS CONTENT OF COLUMN LEACHING TEST OF THE COPPER SULFIDE ORE

(71) Applicant: JX NIPPON MINING & METALS CORPORATION, Tokyo (JP)

(72) Inventors: Shintaro Kawashiro, Hitachi (JP); Akira Miura, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 89 days.

(21) Appl. No.: 15/540,689

(22) PCT Filed: Mar. 14, 2016

(86) PCT No.: PCT/JP2016/059526
§ 371 (c)(1),
(2) Date: Jun. 29, 2017

(87) PCT Pub. No.: WO2016/148305
PCT Pub. Date: Sep. 22, 2016

(65) Prior Publication Data
US 2018/0002781 A1 Jan. 4, 2018

(30) Foreign Application Priority Data
Mar. 13, 2015 (JP) .................................. 2015-051119

(51) Int. Cl.
C22B 15/00 (2006.01)
C22B 3/06 (2006.01)
C22B 3/04 (2006.01)

(52) U.S. Cl.
CPC ............ C22B 15/0071 (2013.01); C22B 3/04 (2013.01); C22B 3/06 (2013.01); C22B 15/0065 (2013.01); C22B 15/0095 (2013.01)

(58) Field of Classification Search
CPC ............ C22B 15/0065; C22B 15/0071; C22B 15/0095; C22B 3/04; C22B 3/06
See application file for complete search history.

(56) References Cited

U.S. PATENT DOCUMENTS

| 8,911,532 B2 * | 12/2014 | Manabe | ............ | C22B 15/0069 75/743 |
| 2010/0018349 A1 * | 1/2010 | Manabe | ............ | C22B 15/0071 75/743 |

(Continued)

FOREIGN PATENT DOCUMENTS

| CA | 2 884 363 A1 | 3/2014 |
| JP | 2005-015864 A * | 1/2005 |

(Continued)

OTHER PUBLICATIONS

JP 2005-015864 A Machine Translation (Year: 2005).*

(Continued)

*Primary Examiner* — Tima M. McGuthry-Banks
(74) *Attorney, Agent, or Firm* — Birch, Stewart, Kolasch & Birch, LLP

(57) ABSTRACT

A method of leaching copper from a copper sulfide ore which includes adding a potential adjustment agent for lowering a potential of a leaching solution obtained after leaching copper from the copper sulfide ore by using iodide ion and iron (III) ion, the leaching solution being stored in a tank for storing the leaching solution.

17 Claims, 4 Drawing Sheets

(56) References Cited

U.S. PATENT DOCUMENTS

2013/0058846 A1   3/2013   Kuwano et al.
2013/0239752 A1   9/2013   Sato et al.
2013/0247720 A1   9/2013   Manabe

FOREIGN PATENT DOCUMENTS

| JP | 2010-24511 A | 2/2010 |
| JP | 2012-149316 A | 8/2012 |
| JP | 2013-189687 A | 9/2013 |
| JP | 2014-55311 A | 3/2014 |

OTHER PUBLICATIONS

International Search Report for PCT/JP2016/059526 dated Jun. 6, 2016.
Written Opinion of the International Searching Authority for PCT/JP2016/059526 dated Jun. 6, 2016.
International Preliminary Report on Patentability and Written Opinion of the International Searching Authority (Forms PCT/IB/326, PCT/IB/373 and PCT/IS/237) dated Sep. 28, 2017, for International Application No. PCT/JP2016/059526.

* cited by examiner

[Fig.1]
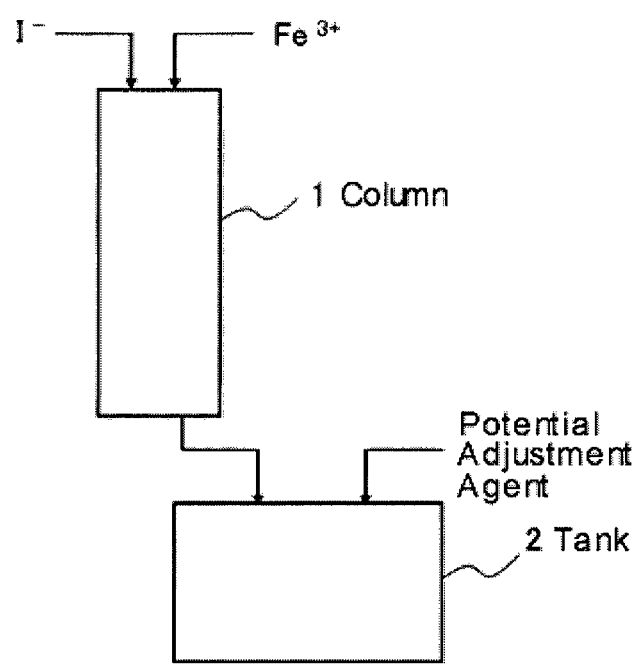

[Fig.2]
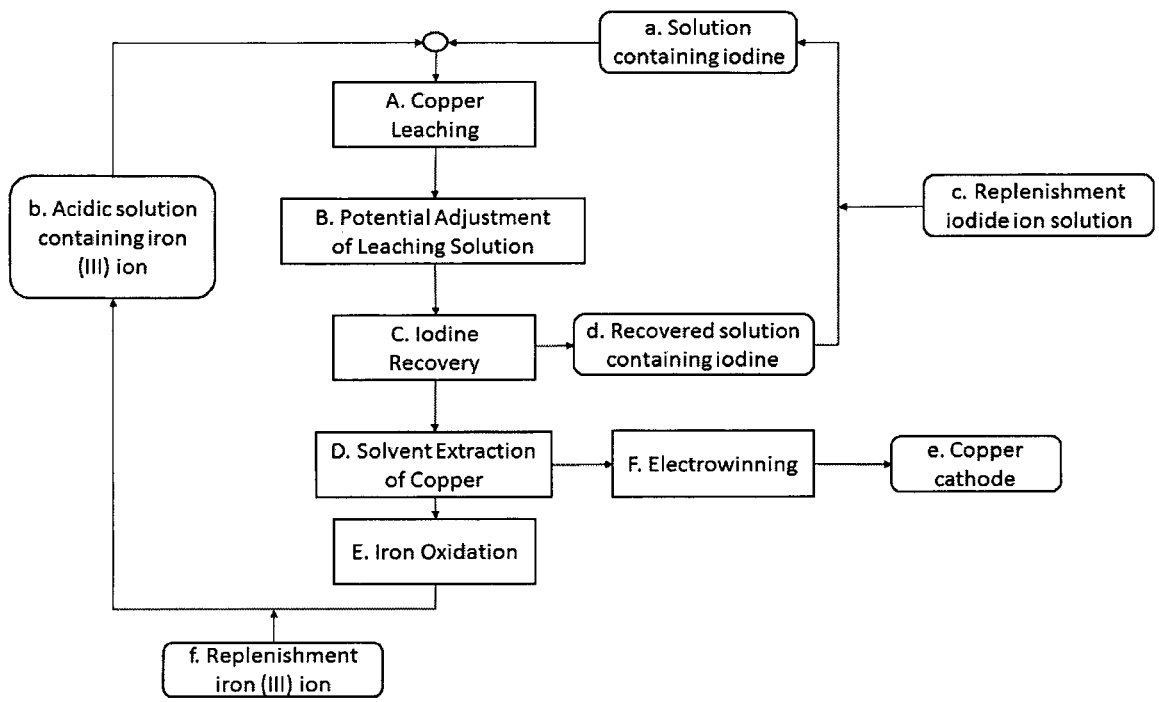
[Fig.3]
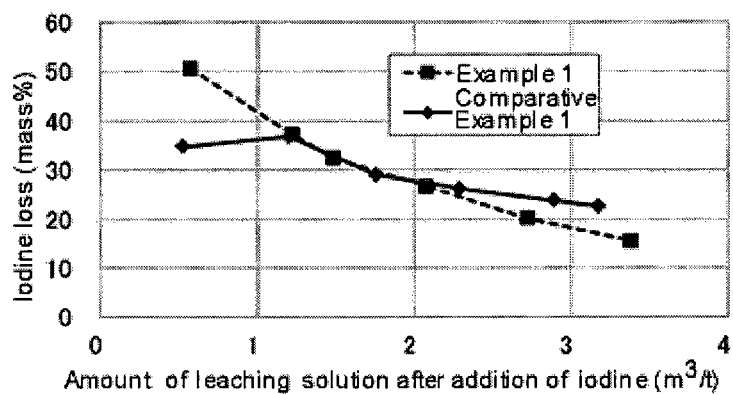

[Fig.4]
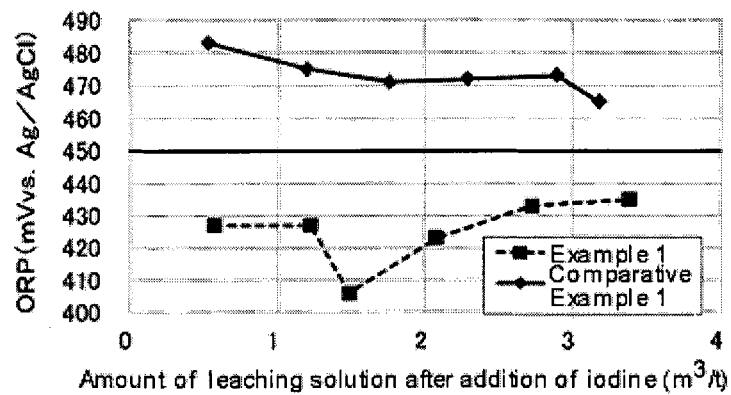
[Fig.5]
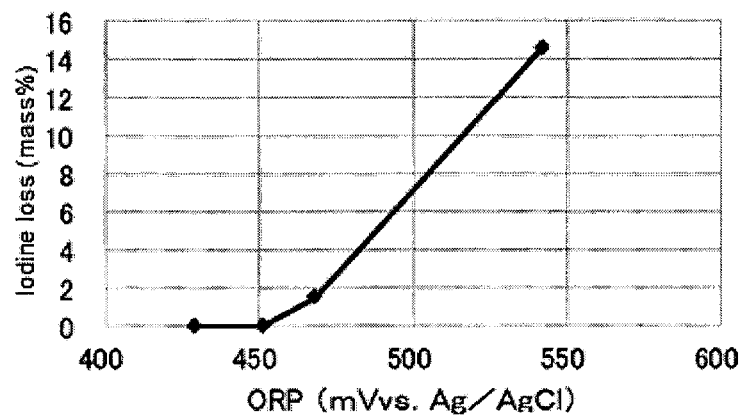
FIG. 5

[Fig.6]
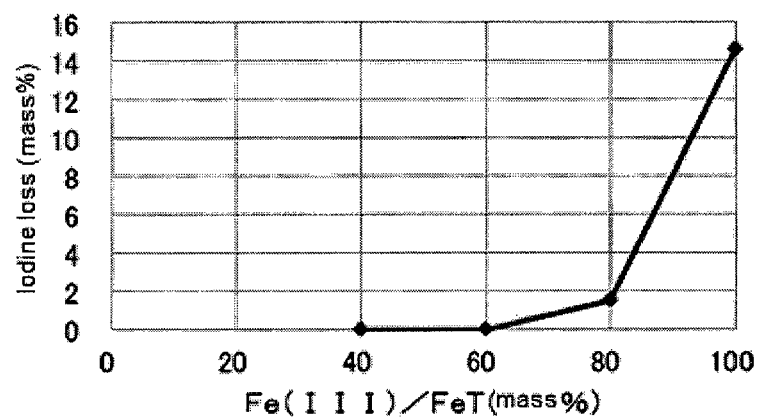
[Fig.7]
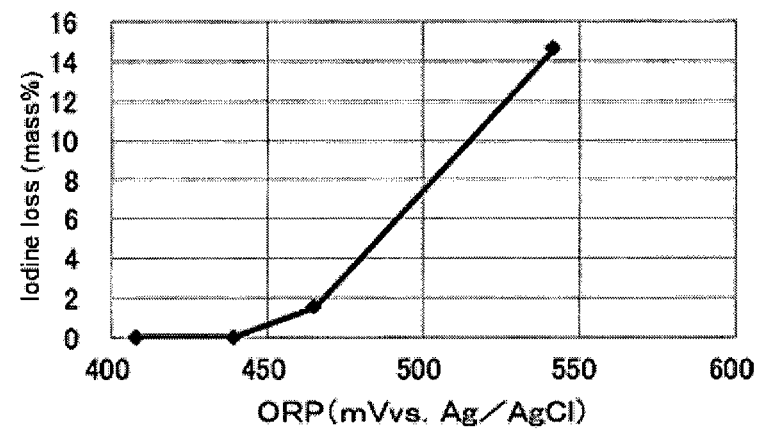

METHOD OF LEACHING COPPER FROM COPPER SULFIDE ORE AND METHOD OF EVALUATING IODINE LOSS CONTENT OF COLUMN LEACHING TEST OF THE COPPER SULFIDE ORE

TECHNICAL FIELD

The present invention relates to a method of leaching copper from copper sulfide ore and a method of evaluating iodine loss content of a column leaching test of the copper sulfide ore. Specifically, the present invention relates to a method of leaching copper from a copper sulfide ore using of iodine and a method of evaluating iodine loss content in a column leaching test of the copper sulfide ore.

BACKGROUND ART

One known method of recovering copper from copper ore is referred to as L-SX-EW process. In the L-SX-EW process, copper ore is leached with sulfuric acid or the like (L: Leaching), selectively recovering copper ions from leaching solution of copper by a solvent extraction (SX: Solvent Extraction), followed by, concentration, and electrolytic cathode copper is produced from this copper sulfate solution by an electrowinning (EW: Electrowinning).

In this process, among copper components contained in the copper ore, copper oxide ore may readily yield copper by a simple acid leaching. Moreover, among copper components contained in the copper ore, secondary copper sulfide ore such as chalcocite ($Cu_2S$), and the like, is leachable by iron (III) ions. Therefore, copper can be efficiently leached by a ferric leaching process with the use of a solution containing iron (III) ions or a bacterial leaching process with the use of a microorganism which can oxidize iron (II) ions in the solution to iron (III) ions.

The ferric leaching process of the secondary copper sulfide ore is supposed to proceed according to the chemical reaction formula below (formula 1). Also, the bacterial leaching process is based on the same reaction mechanism with the ferric leaching process, characterized in continuously supplying an oxidant by consecutively oxidizing iron (II) ions, produced according to formula 1, into iron (III) ions with the aid of iron oxidizing microorganism.

$$Cu_2S+4Fe^{3+} \rightarrow 2Cu^{2+}+4Fe^{2+}+S \quad \text{(formula 1)}$$

Among copper components contained in the copper ore, primary copper sulfide such as chalcopyrite ($CuFeS_2$) may, however, be leached remarkably slowly by the simple acid leaching, the ferric leaching and the bacterial leaching. These methods have therefore been thought to be not suitable, since it takes an extremely long time to attain a high yield of copper leaching. If it would be granted that recovery of copper from the primary copper sulfide ore is not conducted, the yield of copper leaching will stay at a low level, and the economy is diminished anyway.

On the other hand, chalcopyrite is abundant in the copper ore, so that it has been desired to recover copper also from chalcopyrite in a highly efficient manner. There have therefore been proposed various techniques for improving the leaching rate in the process of leaching from the chalcopyrite-containing copper ore. Among them, a method of leaching by adding iodine (or iodide ion) and iron (III) ions has been known to improve the leaching rate from the chalcopyrite-containing copper ore, by feeding iodine as a catalyst in the form of dilute aqueous solution (Japanese Laid-Open Patent Publication Nos. 2010-024511 and 2011-042858).

In the method of leaching the chalcopyrite-containing copper ore, a method which is capable of reducing iodine loss without lowering the final yield of leaching has also proposed. In the method, two-stage leaching of the copper ore is a method that the copper oxide ore and secondary copper sulfide ore, which are soluble without iodine, are first subjected to leaching by the ferric leaching process or the bacterial leaching process based on a general oxidative leaching reaction (first leaching stage), and primary copper sulfide ore which is less soluble in the first leaching stage is then subjected to leaching in a solution containing iodide ion and iron (III) ion (second leaching stage). In the method, by using iodine only for leaching from the primary copper sulfide ore, the iodine loss could be minimized, while keeping the final yield of copper leaching (Japanese Laid-Open Patent Publication No. 2013-189687). It has also been proposed that the loss of iodine can be reduced not by mixing the leaching solution containing iron (III) ion with the leaching solution containing the iodide ion before being fed to a layer of stacked ores, but by feeding each leaching solution through routes independent of each other to the layer of stacked ores containing the copper sulfide ore (Japanese Laid-Open Patent Publication No. 2012-149316).

CITATION LIST

Patent Literatures

[PTL 1] Japanese Laid-Open Patent Publication No. 2010-024511
[PTL 2] Japanese Laid-Open Patent Publication No. JP 2014-55311 A
[PTL 3] Japanese Laid-Open Patent Publication No. 2013-189687
[PTL 4] Japanese Laid-Open Patent Publication No. 2012-149316

SUMMARY OF INVENTION

Technical Problem

Problem to be Solved by the Present Invention

However, iodine volatilization loss from the leaching solution is generated in the leaching of the copper sulfide ore containing iodide ion and iron (III) ion. In particular, when an electric potential of the leaching solution becomes high, volatilization rate of iodine is increased. According to this, in a leaching operation, a volatilization loss has generated and there is a problem that a consumption of iodine is increased.

In addition, unlike the leaching operation in which iodine is continuously recovered from the leaching solution, in a column leaching test which is generally used as a basic test for an optimization of the leaching operation, the leaching solution is kept in a storage for a certain period of time. In the column leaching test, since the iodine volatilization loss is generated during that certain period of time, there is a case that the understanding of the correct iodine loss in the column becomes difficult.

On the other hand, iodine is utilized in a wide variety of fields such as medicine, industry, agriculture, as pharmaceuticals, sterilization and antifungal agents, industrial catalyst, a photosensitive agent, a resin stabilizer, herbicides, and a feed additive. In recent years, iodine has also utilized in a polarizing film of a liquid crystal and a semiconductor etching agent, and the demand thereof are becoming more popular. However, iodine is not inexpensive because it is a valuable natural resource that locality is unevenly distributed. Therefore, a method of efficiently recovering for reusing iodine is strongly demanded in industry in terms of the cost, environmental impact and efficient use of resources.

For example, a method is carried out in which the iodine used for the leaching of the copper ore is recovered and adsorbed with an activated carbon and the recovered and adsorbed resultant is reused in the copper leaching process. If it is possible to reduce the iodine volatilization loss, the recovery rate of iodine recovered from the leaching solution for the reuse is also improved. This also leads to improve the efficiency of the entire process.

In view of the above problems, the present invention is to provide a method which can reduce iodine volatilization loss from the leaching solution obtained after the leaching of the copper sulfide ore and a method which can accurately evaluate iodine loss in the column test.

Moreover, the present invention is to provide a method which can increase the recovery rate of iodine contained in the leaching solution obtained after leaching of the copper sulfide ore and is capable of improving the efficiency of the overall process.

Solution to Problem

Means for Solving the Problem

The present inventors have found out from their intensive studies that the iodine volatilization loss can be reduced by adding a potential adjustment agent for lowering an electric potential of leaching solution obtained after leaching of copper from the copper sulfide ore by using iodide ion and iron (III) ion and stored in a tank for storing the leaching solution.

An aspect of the present invention which has completed on the basis of the findings as described above is a method of leaching copper from a copper sulfide ore encompassing adding a potential adjustment agent for lowering a potential of a leaching solution obtained after leaching copper from the copper sulfide ore by using iodide ion and iron (III) ion, the leaching solution being stored in a tank for storing the leaching solution.

In another aspect of the present invention, there is provided a method of leaching copper from a copper sulfide ore encompassing: a copper leaching step for leaching copper from the copper sulfide ore by using iodide ion and iron (III) ion; a step for adding a potential adjustment agent for lowering a potential of a leaching solution obtained by the copper leaching step and storing the leaching solution; a step for recovering a solution containing iodine from the leaching solution in which the potential adjustment agent is added; and a step for supplying a solution containing recovered iodine to the copper leaching step.

In one embodiment of the method, of leaching copper from the copper sulfide ore according to the present invention, the step for recovering the solution containing iodine includes a step for treating the leaching solution with an activated carbon and allowing the activated carbon to adsorb iodide ion in the leaching solution.

In another embodiment of the method of leaching copper from the copper sulfide ore according to the present invention, the potential adjustment agent includes a solution containing iron (II) ion.

Still in another embodiment of the method of leaching copper from the copper sulfide ore according to the present invention, the potential adjustment agent includes a sulfurous acid solution or an aqueous solution of sulfite.

Still in another embodiment of the method of leaching copper from the copper sulfide ore according to the present invention, the method includes controlling the potential of the leaching solution at 450 mV (silver-silver chloride electrode reference) or lower.

Still in another embodiment of the method of leaching copper from the copper sulfide ore according to the present invention, the method includes controlling a proportion of iron (III) ion concentration relative to a total iron concentration [Fe(III)/FeT ratio] in the leaching solution to 60% by mass or less.

Still in another aspect of the present invention, there is provided a method of leaching copper from a copper sulfide ore, further encompassing a step for recovering copper from acidic solution containing copper ion and iron (II) ion obtained in the step of recovering iodide ion contained in the leaching solution; a step for oxidizing iron (II) ion in the acidic solution to iron (III) ion by treating the acidic solution after copper recovery with iron oxidizing microorganism; and a step for supplying the iron (III) ion obtained in the step for the oxidization to iron (III) ion to the copper leaching step.

Still in another aspect of the present invention, there is provided a method of evaluating iodine loss content of a column leaching test of copper sulfide ore encompassing: conducting a column leaching test by supplying leaching solution including iodide ion and iron (III) ion into a column in which copper sulfide ore to be examined is filled; and evaluating iodine loss content in the column leaching test based on a difference between an amount of total iodine content supplied to the column and an amount of total iodine content in leaching solution discharged from the column, wherein a potential adjustment agent for lowering a potential of the leaching solution is added to the leaching solution discharged from the column.

Advantageous Effects of Invention

According to the present invention, a method for leaching copper from copper sulfide ore which can reduce iodine volatilization loss from the leaching solution which is obtained after leaching of the copper sulfide ore, improve the recovery rate of the iodine from the leaching solution which is obtained after leaching of the copper sulfide ore, and improve the efficiency of the overall process can be provided.

BRIEF DESCRIPTION OF DRAWINGS

FIG. 1 is a schematic diagram illustrating an example of a device of copper leaching process according to an embodiment of the present invention;

FIG. 2 is a diagram illustrating an example of the entire process of copper leaching step according to the embodiment of the present invention;

FIG. 3 is a graph illustrating changes in iodine loss (mass %) in relation to an amount of the leaching solution after addition of iodine ($m^3/t$) in Example 1 and Comparative Example 1.

FIG. 4 is a graph illustrating changes in the potential (mV: silver-silver chloride electrode reference) of the leaching solution in relation to an amount of the leaching solution after addition of iodine ($m^3/t$) in Example 1 and Comparative Example 1.

FIG. 5 is a graph illustrating changes in iodine loss (mass %) in relation to the potential (mV: silver-silver chloride electrode reference) of simulated leaching solution after the addition of iron (II) ion of Example 2;

FIG. 6 is a graph illustrating changes in iodine loss (mass %) in relation to a proportion of iron (III) ion concentration relative to a total iron concentration [Fe(III)/FeT ratio] in the simulated leaching solution in addition of iron (II) ion of Example 2; and FIG. 7 is a graph illustrating changes in iodine loss (mass %) in relation to the potential (mV: silver-silver chloride electrode reference) of the simulated leaching solution in addition of sulfurous acid of Example 3.

DESCRIPTION OF EMBODIMENTS

Copper sulfide ore, which is the target ore of the method of leaching copper from copper sulfide ore according to an embodiment of the present invention refers to a copper sulfide ore mainly containing chalcopyrite and enargite, typically containing oxidized copper ore, primary copper sulfide ore and secondary copper sulfide ore. As shown in FIG. 2, the copper leaching step from copper sulfide ore includes "A. Copper leaching step", "B. Potential adjustment step of leaching solution", "C. Iodine recovery step", "D. Solvent extraction step of copper", "E. Iron oxidation step", and "F. Electrowinning step". Hereinafter, the respective steps are described in detail.

A. Copper Leaching Step

In a copper leaching step, it is possible to use leaching operation of hydrometallurgy of copper with the use of sulfuric acid solution as a leaching solution. For example, a method which is not only a batch stirring leaching, but also heap leaching or dump leaching which sprays sulfuric acid onto the stacked ores may be used. Leaching is carried out at standard temperature and thus steam heating or the like is not particularly necessary. Alternatively, inplace leaching which introduces leaching solution into an ore product preserved underground for leaching can be also used as the method similar to the heap or dump leaching.

In the copper leaching step, as leaching solution, sulfuric acid solution containing iodide ion and iron (III) ion is used. As the material of iodide ion, any type may be used as long as it is water soluble and generates iodide ions. For example, sodium iodide, potassium iodide, ammonium iodide, hydrogen iodide and the like can be used as the material of iodide ion.

It may be preferable that the ratio of the iron (III) ion concentration to the total iodine concentration ($Fe^{3+}$/I) in the leaching solution is greater than or equal to 20:1 (i.e., the iron (III) ion concentration is 2 g/L or more relative to an iodide ion concentration of 100 mg/L). The supply source of iron (III) ions is not particularly limited. Iron sulfate (III), iron chloride (III), or a substance obtained by oxidizing iron (II) ions in an iron sulfate (II) solution may be used as such supply source. The solution whose pH is adjusted to 2.5 or below with the use of sulfuric acid or the like can be used as the leaching solution to prevent precipitation of iron (III) ion.

In the copper leaching step, for example, it is also possible to reduce the iodine loss by leaching the copper ore by multistage leaching as disclosed in Japanese Laid-Open Patent Publication No. 2013-189687. Alternatively, as disclosed in Japanese Laid-Open Patent Publication No. 2012-149316, it is also possible to suppress loss of iodine caused by volatilization and adsorption by feeding leaching solution containing iodide ion and leaching solution containing iron (III) ion through routes independent of each other to column 1 (see FIG. 2).

B. Potential Adjustment Step of Leaching Solution

Leaching solution obtained by the copper leaching step is stored in a storage tank for storing the leaching solution for a certain period of time. When the potential of the leaching solution is high, volatilization rate of iodine is increased and thus a iodine volatilization loss has generated in a leaching operation. As a result, there is a case that consumption of iodine is increased and the processing efficiency is decreased. Alternatively, when leaching test is performed by using a column 1 as shown in FIG. 1, iodine volatilization loss is generated while the leaching solution is stored in a tank 2 and it becomes difficult to understand the iodine loss in the column 1 correctly.

Accordingly, in the present invention, when storing the leaching solution obtained after leaching copper from copper sulfide ore by using iodide ion and iron (III) ion in the tank 2, a potential adjustment agent for lowering the potential of the leaching solution is added to the leaching solution.

The timing of addition of the potential adjustment agent is not particularly limited. For example, the potential adjustment agent may be previously added to the tank 2 before the leaching solution is stored in the tank 2. The potential adjustment agent may be also added directly to the leaching solution before the leaching solution is stored in the tank 2. Alternatively, after supplying the leaching solution to the tank 2, the potential adjustment agent may be continuously or intermittently added to the tank 2 in which the leaching solution is stored as needed.

The period for which the leaching solution is stored in the tank 2 is not limited to the following. For example, it may be preferable to add the potential adjustment agent to the leaching solution which is stored for 24 hours or more, more typically, for about two days to seven days. Accordingly, the effect of the volatilization loss reduction of iodine can be significantly obtained and thus the iodine recovery rate is improved in the iodine recovery step and the processing efficiency of the entire process flow is also improved. The type of the tank 2 is not particularly limited if it has a structure which can store the leaching solution for a certain period of time.

As for the potential adjustment agent, a solution containing iron (II) ions, a sulfurous acid solution, an aqueous solution of sulfite, or the like may be suitably used. As for the solution containing iron (II) ions, it is not particularly limited as long as it is the acidic solution to generate iron (II) ions. For example, iron (II) sulfate solution, iron chloride (II) solution and the like, may be suitably used as the potential adjusting agent.

As for the sulfurous acid solution or the aqueous solution of sulfite, it is not particularly limited as long as it is the acidic solution to generate sulfite ions. For example, sodium sulfite, sodium bisulfite, or the like may be suitably used.

It is preferable that the potential of the leaching solution which is stored in the tank 2 is controlled at 450 mV (silver-silver chloride electrode reference) or lower by the addition of the potential adjustment agent. When the potential of the leaching solution becomes more than 450 mV, there is a case in which the iodine volatilization loss is likely to occur. On the contrary, though a lower potential of the leaching solution may suppress the occurrence of iodine volatilization loss for a long time, it may be unfavorable on processing efficiency side if the potential adjustment agent is excessively added. The potential of the leaching solution may be, but is not limited to the following, for example, at 350 mV or more.

Moreover, iodine volatilization loss is more likely to occur when the proportion of the iron (III) ion concentration to the total iron concentration [Fe (III)/FeT ratio] in the leaching solution stored in the tank 2 becomes more than 60% by mass. It is preferable to control the proportion of iron (III) ion concentration relative to a total ion concentration [Fe (III)/FeT ratio] in the leaching solution at 60% by mass or less.

C. Iodine Recovery Step

As shown in FIG. 2, in the iodine recovery step, a solution containing iodine is recovered from the leaching solution in which the potential adjustment agent is added. A method using an oxidizing agent, an ion exchange resin, or an activated carbon may be usable as the method for recovering iodine. Particularly, it may be preferable that the total iodine concentration of the solution becomes less than 1 mg/L by using a material that has an ability to adsorb iodine by hydrophobic interactions. For example, the leaching solution in which the potential adjustment agent is added is treated with an activated carbon, the iodine ions in the leaching solution is adsorbed to the activated carbon, and the solution containing iodine can be recovered from the activated carbon to which the iodide ions is adsorbed. It is possible to reuse the iodine used once in the copper leaching step by replenishing iodide ions ("c. replenishment iodide ion solution in FIG. 2") to the recovered solution containing iodine (d. solution containing iodine) as necessary and using the solution as the iodine source ("a. solution containing iodine" in FIG. 2) in the copper leaching step. In the present embodiment, recovery rate of the iodine will be improved compared to the conventional case without potential adjustment since in the present embodiment, the potential of the leaching solution is adjusted to suppress the occurrence of the volatilization loss of iodine. Consequently, the process efficiency of the entire process flow as shown in FIG. 2 is also improved.

In the step of the iodide ions in the leaching solution is adsorbed to the activated carbon, it is also possible to use a solid having a hydrophobic surface other than the activated carbon, such as coke and a hydrophobic resin. It may be preferable to use activated carbon because the specific surface area and iodine removal capacity are higher than those of these materials. Iodine can be recovered by the chemical treatment, the heat treatment, or the combustion treatment of the activated carbon in which iodine is adsorbed. For example, iodine is recovered as iodide ions in a solution by treating the activated carbon with a solution containing sulfurous acid ions to isolate the iodide ions from the activated carbon. For example, iodine can be recovered by using a solution containing 1 to 100 times by weight of sulfurous acid ions with respect to iodine eluted from the activated carbon.

D. Solvent Extraction Step of Copper

The acidic solution containing copper ion and iron (II) ion which is obtained after adsorbing iodide ions in the leaching solution with the activated carbon is subjected to a solvent extraction treatment using an extraction agent to selectively extract copper in the acidic solution. The solvent extraction step of copper may be conducted in any stages, for example, it can be conducted in "C. Iodine recovery step" as described above, or before or after the iron oxidation step as described below. A copper cathode can be produced by electrowinning the copper extracted by the solvent extraction (F. electrowinning step).

E. Iron Oxidation Step

In the iron oxidation step, the acidic solution obtained after copper is recovered is treated with iron oxidizing microorganism to oxidize iron (II) ions in the acidic solution to iron (III) ions. For example, as disclosed in Japanese Laid-Open Patent Publication No. 2012-188725, the iron oxidation step may be conducted by using a microorganism-carrying support on which the iron oxidizing microorganism is deposited and fixed. Since the iron (III) ions (b. acidic solution containing iron (III) ions in FIG. 2) obtained in this iron oxidation step are added to the copper leaching step while supplying the replenishment iron (III) ions as necessary, the copper leaching from the copper sulfide ore can be performed more efficiently with the use of the iron (II) ions generated in the processing flow.

EXAMPLES

Hereinafter, the present invention is more specifically described by way of examples and comparative examples, but these examples are merely provided in order to understand the present invention and advantages, and in no way to limit the invention.

Example 1

As a copper ore for a target, a crude ore mined in Chile was used. Total copper content was 0.43%. Copper ore composition, estimated by Sequential Assay, was found to be 5% copper oxide ore, 45% secondary copper sulfide ore, and 50% primary copper sulfide ore.

The Sequential Assay herein is a method of eluting copper ores in the ore according to procedures below, and calculating the contents of copper oxide ore, secondary copper sulfide ore and primary copper sulfide ore based on assay data of the eluates. The analysis was outsourced to a testing and consulting facility, SGS Lakefield Research Limited Chile S.A.

(1) Copper oxide ore: a sample crushed to a certain grain size was added with sulfuric acid, and the mixture was stirred for a certain period. Dissolved copper was quantified.

(2) Secondary copper sulfide ore: a solid fraction obtained by solid-liquid separation in the assay of the copper oxide ore was added with sodium cyanide solution, and the mixture was stirred for a certain period. Dissolved copper was quantified.

(3) Primary copper sulfide ore: a solid fraction obtained by solid-liquid separation of the secondary copper sulfide ore was added with nitric acid and perchloric acid, the mixture was dried up on a hot plate, the residue was treated with hydrochloric acid and distilled water for dissolution. Dissolved copper was quantified.

The crude ore having the composition described in the above was crushed to a grain size of 11.2 mm or smaller, and 12 kg of which was packed in a transparent vinyl chloride cylinder of 10 cm in diameter and 1 m in height. The bottom portion of the vinyl chloride cylinder was attached with a filter cloth and a perforated plate made of vinyl chloride, so that the leaching solution may be recovered in the tank 2 as the leaching solution after passing therethrough. The leaching solution was supplied using a pump, from the top of the vinyl chloride cylinder.

Sulfuric acid leaching was firstly conducted including a condition of pH 1.2 and a feeding rate of 1 L/day (First leaching stage). Iron (III) ion leaching was then conducted including a condition of iron (III) concentration of 5 g/L, pH 1.6 and a feeding rate of 1 L/day (Second leaching stage). Thereafter, iodide leaching using a solution containing iodide ion and iron (III) ion was conducted (Third leaching stage). Potassium Iodide was used as an iodide ion source, and conditions include a concentration of 260 mg/L (iodine concentration of 200 mg/L), pH 1.6, and a feeding rate of 0.5 L/day. Iron (III) ion concentration was adjusted to 5 g/L, pH 1.6, and a feeding rate of 0.5 L/day. Accordingly, the final concentration was 100 mg/L for iodine and 5 g/L for iron (III) ion, pH 1.6, and a feeding rate was 1 L/day. Fixed quantity of a solution including 20 g/L of iron (II) ions and pH 1.6 was added to the tank 2 while leaching with the solution including iodide ion and iron (III) ion.

Comparative Example 1

For comparison, first to third leaching stages were carried out without adding the solution including iron (II) ion to the tank for storing the leaching solution while leaching with the solution including iodide ion and iron (III) ion as disclosed in Example 1.

The copper concentration and the iron concentration in Example 1 and Comparative Example 1 were measured by using an ICP emission spectrophotometric analyzer (ICP-AES), and the iodine concentration was determined by ion selective electrode after reducing iodine into iodide ion. The iodine loss was estimated based on the amount of iodine in the leaching solution before leaching and the amount of iodine in the leaching solution after leaching. Sulfuric acid was used as the pH adjustment agent.

FIG. 3 is a graph illustrating changes in iodine loss (mass %) in relation to an amount of the leaching solution after addition of iodine ($m^3$/t) in Example 1 and Comparative Example 1.

As shown in FIG. 3, the iodine loss at the end of the iodide leaching step, Example 1 was 15.5 mass % and Comparative Example 1 was 22.6 mass %. Iodine volatilization loss was suppressed in Example 1.

This means that iodine volatilization loss from the leaching solution is reduced by adding the solution containing iron (II) ion to the tank for storing the leaching solution.

FIG. 4 is a graph illustrating changes in potential (mV: silver-silver chloride electrode reference) of the leaching solution in relation to an amount of the leaching solution after addition of iodine ($m^3$/t) in Example 1 and Comparative Example 1.

As shown in FIG. 4, it can be understood that ORP of the leaching solution in Example 1 was 450 mV (silver-silver chloride electrode reference) or lower and ORP of the leaching solution in Comparative Example 1 was above 450 mV (silver-silver chloride electrode reference).

This means that iodine volatilization loss was reduced by controlling ORP of the leaching solution at 450 mV (silver-silver chloride electrode reference) or lower.

Example 2

5 L of simulated leaching solution including conditions of iodine concentration of 100 mg/L, total iron concentration of 5 g/L, and pH of 1.8 was stored in a fluorine processed large bottle having a storage capacity of 20 L and allowed to stand for one week in a sealed condition at standard temperature. The potential of the simulated leaching solution was changed in a range of 430 mV and 540 mV (silver-silver chloride electrode reference) by the addition of the iron (II) ions while the solution was stored. Iron sulfate was used as the source of iron (II) ions.

Example 3

5 L of simulated leaching solution including conditions of iodine concentration of 100 mg/L, iron (III) concentration of 5 g/L, and pH of 1.8 was stored in a fluorine processed large bottle having a storage capacity of 20 L and allowed to stand for one week in a sealed condition at standard temperature. The potential of the simulated leaching solution was changed in a range of 410 mV and 540 mV (silver-silver chloride electrode reference) by the addition of the sulfurous acid solution while the solution was stored. When the sulfurous acid solution was added to the simulated leaching solution, sulfuric acid is generated by oxidation-reduction reaction of the iron (III) ions and the sulfurous acid solution and pH of the solution is lowered. Thus, sodium hydroxide was added to the simulated leaching solution to re-adjust pH at 1.8.

The iron concentrations in Examples 2 and 3 were measured by using an ICP emission spectrophotometric analyzer (ICP-AES), and the iodine concentrations were determined by ion selective electrode after reducing iodine into iodide ion. The iodine loss was estimated based on the amount of iodine in the simulated leaching solution before storing and the amount of iodine in the simulating leaching solution after one week storing. Sulfuric acid and sodium hydroxide were used as the pH adjustment agent.

FIG. 5 is a graph illustrating changes in iodine loss (mass %) in relation to the potential (mV: silver-silver chloride electrode reference) of simulated leaching solution by the addition of iron (II) ion of Example 2.

As shown in FIG. 5, iodine loss was 0 mass % when the ORP of the simulated leaching solution was 430 mV or 450 mV (silver-silver chloride electrode reference). Iodine loss occurred when the ORP of the simulated leaching solution was 470 mV or 540 mV (silver-silver chloride electrode reference).

This means that the iodine loss was decreased by controlling the ORP of the simulated leaching solution at 450 mV (silver-silver chloride electrode reference) or lower.

FIG. 6 is a graph illustrating changes in iodine loss (mass %) in relation to a proportion of iron (III) ion concentration relative to a total ion concentration [Fe (III)/FeT ratio] in the simulated leaching solution in addition of iron (II) ion of Example 2.

As shown in FIG. 6, iodine loss was 0 mass % when Fe(III)/FeT was 40 mass % or 60 mass %. Iodine loss occurred when Fe(III)/FeT was 80 mass % or 100 mass %.

This means that the iodine loss was decreased by controlling Fe(III)/FeT of the simulated leaching solution to 60 mass % or less.

FIG. 7 is a graph illustrating changes in iodine loss (mass %) in relation to the potential (mV: silver-silver chloride electrode reference) of the simulated leaching solution in addition of sulfurous acid of Example 3.

As shown in FIG. 7, iodine loss was 0 mass % when the ORP of the simulated leaching solution was 410 mV or 440 mV (silver-silver chloride electrode reference). Iodine loss occurred when the ORP of the simulated leaching solution was 465 mV or 540 mV (silver-silver chloride electrode reference).

This means that the iodine loss was decreased by controlling the ORP of the simulated leaching solution at 450 mV (silver-silver chloride electrode reference) or lower.

REFERENCE SIGNS LIST

1 Column
2 Tank

The invention claimed is:

1. A method of leaching copper from a copper sulfide ore comprising adding a potential adjustment agent for lowering a potential of a leaching solution obtained after leaching copper from the copper sulfide ore by using iodide ion and iron (III) ion and controlling the potential of the leaching solution obtained after leaching copper from the copper sulfide ore at 450 mV (silver-silver chloride electrode reference) or lower, the leaching solution being stored in a tank for storing the leaching solution.

2. The method according to claim 1, wherein the potential adjustment agent comprises a solution containing iron (II) ion.

3. The method according to claim 2, comprising controlling a proportion of iron (III) ion concentration relative to a total iron concentration [Fe(III)/FeT ratio] in the leaching solution to 60% by mass or less.

4. The method according to claim 1, wherein the potential adjustment agent comprises a sulfurous acid solution or an aqueous solution of sulfite.

5. The method according to claim 1, comprising controlling a proportion of iron (III) ion concentration relative to a total iron concentration [Fe(III)/FeT ratio] in the leaching solution to 60% by mass or less.

6. The method of claim 1, wherein a concentration of the iron (III) ion used in a step of leaching copper from the copper sulfide ore is more than 20 times as great as a concentration of the iodide ion and the concentration of the iron (III) ion is 2g/L or more.

7. A method of leaching copper from a copper sulfide ore comprising:
a copper leaching step for leaching copper from the copper sulfide ore by using iodide ion and iron (III) ion;
a step for adding a potential adjustment agent for lowering a potential of a leaching solution obtained by the copper leaching step, controlling the potential of the leaching solution obtained after leaching copper from the copper sulfide ore at 450 mV (silver-silver chloride electrode reference) or lower and storing the leaching solution;
a step for recovering a solution containing iodine from the leaching solution in which the potential adjustment agent is added; and
a step for supplying a solution containing recovered iodine to the copper leaching step.

8. The method according to claim 7, wherein the step for recovering the solution containing iodine comprises a step for treating the leaching solution with an activated carbon and allowing the activated carbon to adsorb iodide ion in the leaching solution.

9. The method according to claim 8, wherein the potential adjustment agent comprises a solution containing iron (II) ion.

10. The method according to claim 8, wherein the potential adjustment agent comprises a sulfurous acid solution or an aqueous solution of sulfite.

11. The method according to claim 8, comprising controlling a proportion of iron (III) ion concentration relative to a total iron concentration [Fe(III)/FeT ratio] in the leaching solution to 60% by mass or less.

12. The method according to claim 7, comprising:
a step for recovering copper from acidic solution containing copper ion and iron (II) ion obtained in the step of recovering iodide ion contained in the leaching solution;
a step for oxidizing iron (II) ion in the acidic solution to iron (III) ion by treating the acidic solution after copper recovery with iron oxidizing microorganism; and
a step for supplying the iron (III) ion obtained in the step for the oxidization to iron (III) ion to the copper leaching step.

13. The method according to claim 7, wherein the potential adjustment agent comprises a solution containing iron (II) ion.

14. The method according to claim 7, wherein the potential adjustment agent comprises a sulfurous acid solution or an aqueous solution of sulfite.

15. The method according to claim 7, comprising controlling a proportion of iron (III) ion concentration relative to a total iron concentration [Fe(III)/FeT ratio] in the leaching solution to 60% by mass or less.

16. The method of claim 7, wherein a concentration of the iron (III) ion used in the copper leaching step is more than 20 times as great as a concentration of the iodide ion and the concentration of the iron (III) ion is 2g/L or more.

17. A method for measuring iodine loss content of a column leaching test of copper sulfide ore comprising:
conducting a column leaching test by supplying a leaching solution including iodide ion and iron (III) ion into a column in which copper sulfide ore to be examined is filled; and
measuring a difference between an amount of total iodine content supplied to the column and an amount of total iodine content in a leaching solution discharged from the column, to determine an amount of iodine loss in the column leaching test;
wherein the leaching solution discharged from the column comprises a potential adjustment agent for lowering a potential of the leaching solution so that the potential of the leaching solution is kept at 450 mV (silver-silver chloride electrode reference) or lower.

* * * * *